United States Patent
Jain et al.

(10) Patent No.: US 12,413,392 B2
(45) Date of Patent: Sep. 9, 2025

(54) GENERATING INDEPENDENT ENCRYPTION KEYS FOR STORAGE OBJECTS

(71) Applicant: VMware LLC, Palo Alto, CA (US)

(72) Inventors: Abhay Kumar Jain, Santa Clara, CA (US); Long Yang, Fremont, CA (US); Wenguang Wang, Santa Clara, CA (US); Chandrakanth Gadhiraju, Fremont, CA (US)

(73) Assignee: VMware LLC, Palo Alto, CA (US)

( * ) Notice: Subject to any disclaimer, the term of this patent is extended or adjusted under 35 U.S.C. 154(b) by 233 days.

(21) Appl. No.: 18/357,390

(22) Filed: Jul. 24, 2023

(65) Prior Publication Data
US 2025/0038958 A1    Jan. 30, 2025

(51) Int. Cl.
*H04L 9/08* (2006.01)
*G06F 9/455* (2018.01)

(52) U.S. Cl.
CPC ........ *H04L 9/0822* (2013.01); *G06F 9/45558* (2013.01); *G06F 2009/45587* (2013.01)

(58) Field of Classification Search
None
See application file for complete search history.

(56) References Cited

U.S. PATENT DOCUMENTS

| | | | | |
|---|---|---|---|---|
| 8,930,698 | B2* | 1/2015 | Hunter | H04L 67/1097 380/278 |
| 10,587,406 | B1* | 3/2020 | Levin | H04L 9/0869 |
| 11,314,440 | B1* | 4/2022 | Wang | G06F 3/0608 |
| 2009/0252330 | A1* | 10/2009 | Patnala | H04L 9/0822 380/279 |
| 2021/0367770 | A1* | 11/2021 | Patel | H04L 9/0894 |
| 2022/0069981 | A1* | 3/2022 | Jog | H04L 9/088 |
| 2022/0179674 | A1* | 6/2022 | Goel | G06F 9/45558 |
| 2022/0209945 | A1* | 6/2022 | Li | H04L 9/0863 |
| 2024/0056290 | A1* | 2/2024 | Wilson | H04L 9/0897 |
| 2024/0259210 | A1* | 8/2024 | Ruan | H04L 9/3242 |
| 2025/0137211 | A1* | 5/2025 | Patki | E01F 13/028 |

* cited by examiner

*Primary Examiner* — Lashonda Jacobs-Burton
(74) *Attorney, Agent, or Firm* — King Intellectual Asset Management

(57) ABSTRACT

Aspects of the disclosure generate independent encryption keys for objects (e.g., virtual machine disks (VMDKs)) without requiring the management of multiple keys. An encryption manager obtains a primary encryption key, an object identifier (ID) comprising a globally unique ID (GUID) for an object, a data salt comprising the object ID and a data salt string, and a metadata salt comprising the object ID and a metadata salt string. A data encryption key is generated using the primary encryption key, the data salt, and a one-way function. A metadata encryption key is generated using the primary encryption key, the metadata salt, and the one-way function. Because the data salt string and metadata salt string differ, the data encryption and metadata encryption keys differ. Object IDs for different objects differ, so each object and its metadata have globally unique keys. Key generation (other than the primary key) is deterministic, simplifying key management.

20 Claims, 11 Drawing Sheets

GENERATING INDEPENDENT ENCRYPTION KEYS FOR STORAGE OBJECTS

BACKGROUND

Data encryption is a fundamental aspect of cybersecurity. As part of the encryption solution, objects and associated metadata in a system should be encrypted on disk ("at rest"). Every so often, though, encryption keys may be exposed as a result of hacker activity or maintenance/recovery operations. When an encryption key has been exposed, the data which had been encrypted with the exposed key is at risk of compromise.

Not only is this problematic when a large number of data objects are encrypted with the same exposed encryption key, but in a multi-tenancy environment, encrypting different clients' data with the same encryption key introduces unfavorable risks. One existing solution is to create a large number of different encryption keys, and using each encryption key to encrypt a smaller set of data objects, with each set including only data objects belonging to a single client. This results in a large number of encryption keys that is difficult to manage.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspects of the disclosure provide solutions for generating independent encryption keys for storage objects. Examples include obtaining a primary encryption key; obtaining a first object identifier (ID), the first object ID comprising a globally unique ID (GUID) for a first object: obtaining a first data salt comprising the first object ID and a first data salt string: obtaining a first metadata salt comprising the first object ID and a first metadata salt string, the first metadata salt string differing from first data salt string; generating a first data encryption key using the primary encryption key, the first data salt, and a one-way function: generating a first metadata encryption key using the primary encryption key, the first metadata salt, and the one-way function: encrypting the first object using the first data encryption key; and encrypting metadata of the first object using the first metadata encryption key.

BRIEF DESCRIPTION OF THE DRAWINGS

The present description will be better understood from the following detailed description read in the light of the accompanying drawings, wherein.

Figure 1:
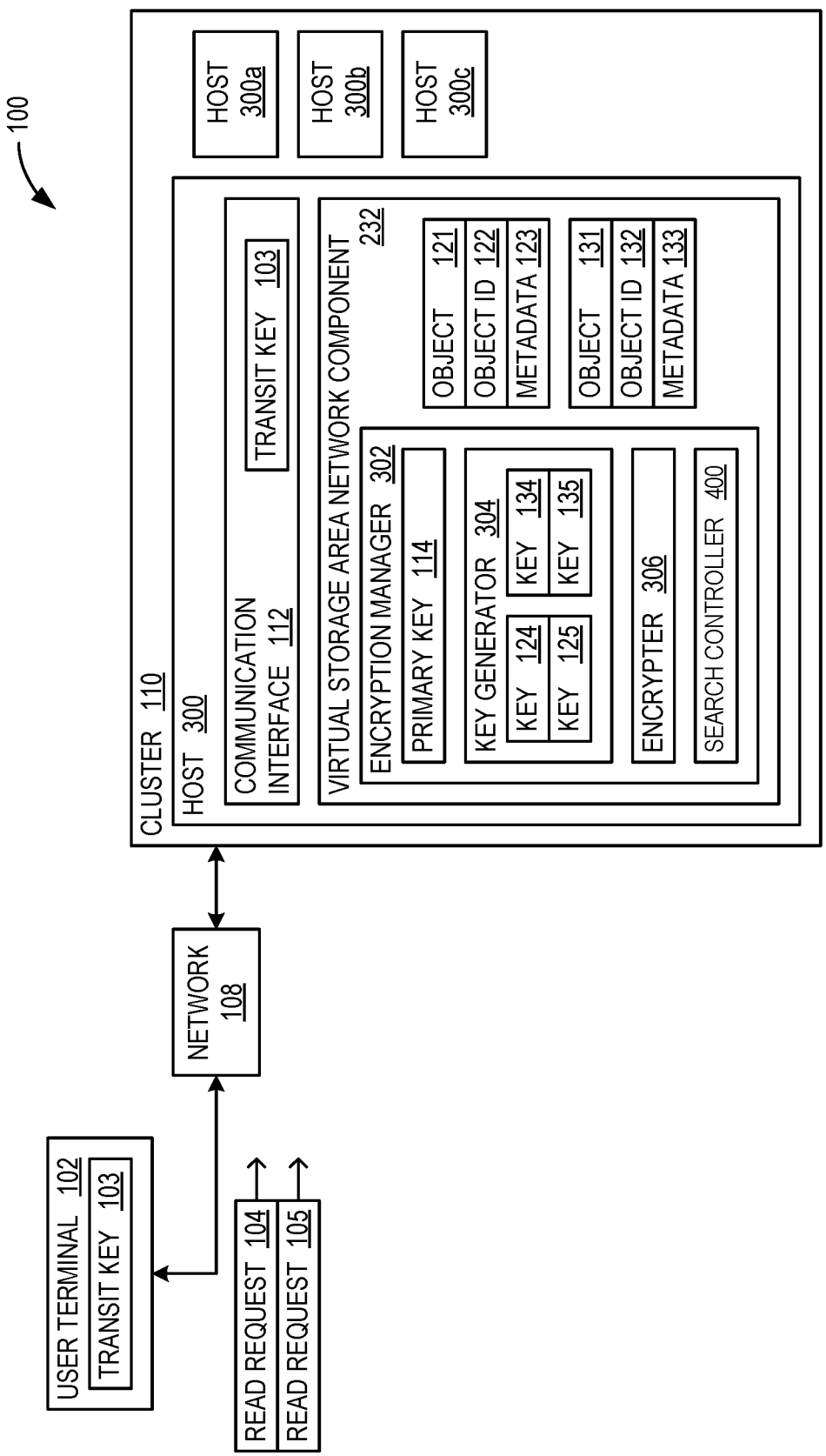
FIG. 1 illustrates an example architecture that advantageously generates independent encryption keys for storage objects.

Any of the figures may be combined into a single example or embodiment.

DETAILED DESCRIPTION

Aspects of the disclosure generate independent encryption keys for objects (e.g., virtual machine (VM) disks (VMDKs)) without requiring the management of multiple keys. An encryption manager obtains a primary encryption key, an object identifier (ID) comprising a globally unique ID (GUID) for an object, a data salt comprising the object ID and a data salt string, and a metadata salt comprising the object ID and a metadata salt string. A data salt is a cryptographic salt for a data file, and a metadata salt is a cryptographic salt for metadata of the data file. A cryptographic salt is a string that is added to (e.g., appended to, prepended to, concatenated with, etc.) a base string, so that when the combination of the base string and the cryptographic salt is passed through a one-way function (e.g., a hash function), the output will differ. This adds security when using the one-way function to generate encryption keys, compared with using only the base string, because a larger number of encryption keys are possible.

A data encryption key is generated using the primary encryption key, the data salt, and a one-way function. A metadata encryption key is generated using the primary encryption key, the metadata salt, and the one-way function. Because the data salt string and metadata salt string differ, the data encryption key and metadata encryption key differ. The object IDs for different objects differ, so each object and its metadata have globally unique keys. Key generation, except for the primary encryption key, is deterministic, simplifying key management.

Encryption is performed at the object level for data at rest and is transparent to users. Data is decrypted upon retrieval and data in transit may be encrypted with a different key, in order to minimize key exposure, even while maintaining security for communication. Although symmetric encryption is described herein, some examples may use a combination of public key and symmetric encryption. Aspects of the disclosure may be used in both virtualized and non-virtualized environments.

Aspects of the disclosure improve security for computing operations by providing a large number of independent encryption keys with drastically simplified key management, relative to existing solutions. This permits encrypting a large number of data objects with unique keys, including encrypting data and its corresponding metadata with different keys-without having to manage the key separately. This provides a higher level of security even while reducing the infrastructure required to support that level of security operations, thereby consuming fewer computing hardware resources. This advantageous operation is achieved, at least in part, by (i) obtaining a data salt comprising an object ID and a data salt string, (ii) obtaining a metadata salt comprising the object ID and a metadata salt string, (iii) generating a data encryption key using a primary encryption key, the data salt, and a one-way function, and (iv) generating a metadata encryption key using the primary encryption key, the metadata salt, and the one-way function. Thus, because cybersecurity is a key aspect in computing, aspects of the disclosure provide a practical, useful result to solve a technical problem in the domain of computing.

FIG. 1 illustrates an example architecture 100 that advantageously generates independent encryption keys for storage objects. In architecture 100, a user terminal 102 communicates with a cluster 110 of VMs over a network 108. Cluster 110 uses a plurality of hosts, specifically a host 300 and other hosts 300a-300c. Communication across network 108, between user terminal 102 and cluster 110 (e.g., between user terminal 102 and host 300), is encrypted for security using a transit encryption key 103 for data in transit. Data at rest (e.g., data objects stored on host 300) is encrypted with different keys than transit encryption key 103.

For example, when at rest, an object 121 is encrypted with a data encryption key 124, metadata 123 for object 121 is encrypted with a metadata encryption key 125, an object 131 is encrypted with a data encryption key 134, and metadata 133 for object 131 is encrypted with a metadata encryption key 135. When user terminal 102 requests to have a local copy of object 121, user terminal 102 transmits a read request 104 for object 121 to host 300. Read request 104 is received by a communication interface 112 of host 300, and object 121 is retrieved from a virtual storage area network component 232, which is described in further detail in relation to FIG. 2.

An encryption manager 302 in virtual storage area network component 232 decrypts object 121 using data encryption key 124 in an encrypter 306, from cyphertext into cleartext. In some examples, encryption manager 302 is located elsewhere in host 300. Communication interface 112 encrypts object 121 using transit encryption key 103 for secure transmission across network 108. Communication interface 112 may use encrypter 306 or its own cryptographic module for encryption and decryption with transit encryption key 103. Communication interface 112 then transmits encrypted object 121 across network 108 to user terminal 102. User terminal decrypts object 121 using its own copy of transit encryption key 103.

Similarly, user terminal 102 uses a read request 105 to retrieve object 131, although in some examples, metadata 121 and metadata 133 are not accessed by users, but instead only internal functions. The process of decryption upon retrieval from storage (at rest) and encryption for transit for object 131 is similar to that described for object 121. Each of objects 121 and 131 has its own unique identifier (ID), a GUID in some examples. Object 121 has a unique object ID 122, and object 131 has a unique object ID 132. In some examples, metadata 123 and 133 are not referenced using their own unique object IDs, but rather the object IDs of the data objects (or storage objects) to which they correspond (e.g., objects 121 and 131, respectively).

An advantageous operation of architecture 100 is that keys 124, 125, 134, and 135 do not need to be stored, but may instead be regenerated when needed. To accomplish this, encryption manager 302 has a key generator 304 that generates each of keys 124, 125, 134, and 135 using a primary encryption key 114 and object IDs 122 and 132. In some examples, primary encryption key 114 is a master key for cluster 110, and is thus a cluster level key.

To generate data encryption key 124, primary encryption key 114 is concatenated with a salt value that is unique to object 121, such as object ID 122 and a data-specific salt string (e.g., the word "data"). The result is passed through a one-way function 310 (shown in FIG. 3) with in key generator 304, and the output of one-way function 310 is used directly as data encryption key 124, or subjected to some additional processing to become data encryption key 124. Metadata encryption key 125 is generated similarly to data encryption key 124, except using a salt value that is unique to metadata 123, such as object ID 122 and a metadata-specific salt string (e.g., the word "metadata"). Data encryption key 134 and metadata encryption key 135 are generated similarly to data encryption key 124 and metadata encryption key 125, except using object ID 132 in place of object ID 122.

Some examples produce multiple generations of some or all of keys 124, 125, 134, and so require additional information within the salt values. Such examples may use a generation number (also shown in FIG. 3) as an additional salt component. However, security considerations may dissuade the saving of generation number. To regenerate a key using a generation number (e.g., metadata encryption key 125), the current generation number will then need to be determined. A search controller 400 manages searches for generation numbers when generation numbers are not stored. The operation of search controller 400 is described in relation to FIG. 4.

In some examples, object 121 and metadata 123 are both encrypted with data encryption key 124 and object 131 and metadata 133 are both encrypted with data encryption key 134. In such examples, data encryption key 124 is generated by passing a concatenation of primary encryption key 114 and object ID 122 through a one-way function (e.g., one-way function 310), and data encryption key 134 is generated by passing a concatenation of primary encryption key 114 and object ID 132 through the one-way function.

In some examples, host 300a, host 300b, and host 300c are configured similarly to host 300. Although only four hosts are shown, it should be understood that other examples may use a different number of hosts. Although only two objects and their corresponding metadata are shown, it should be understood that other examples may use a different number of objects, such as numbering in the tens of thousands or more.

Figure 2:
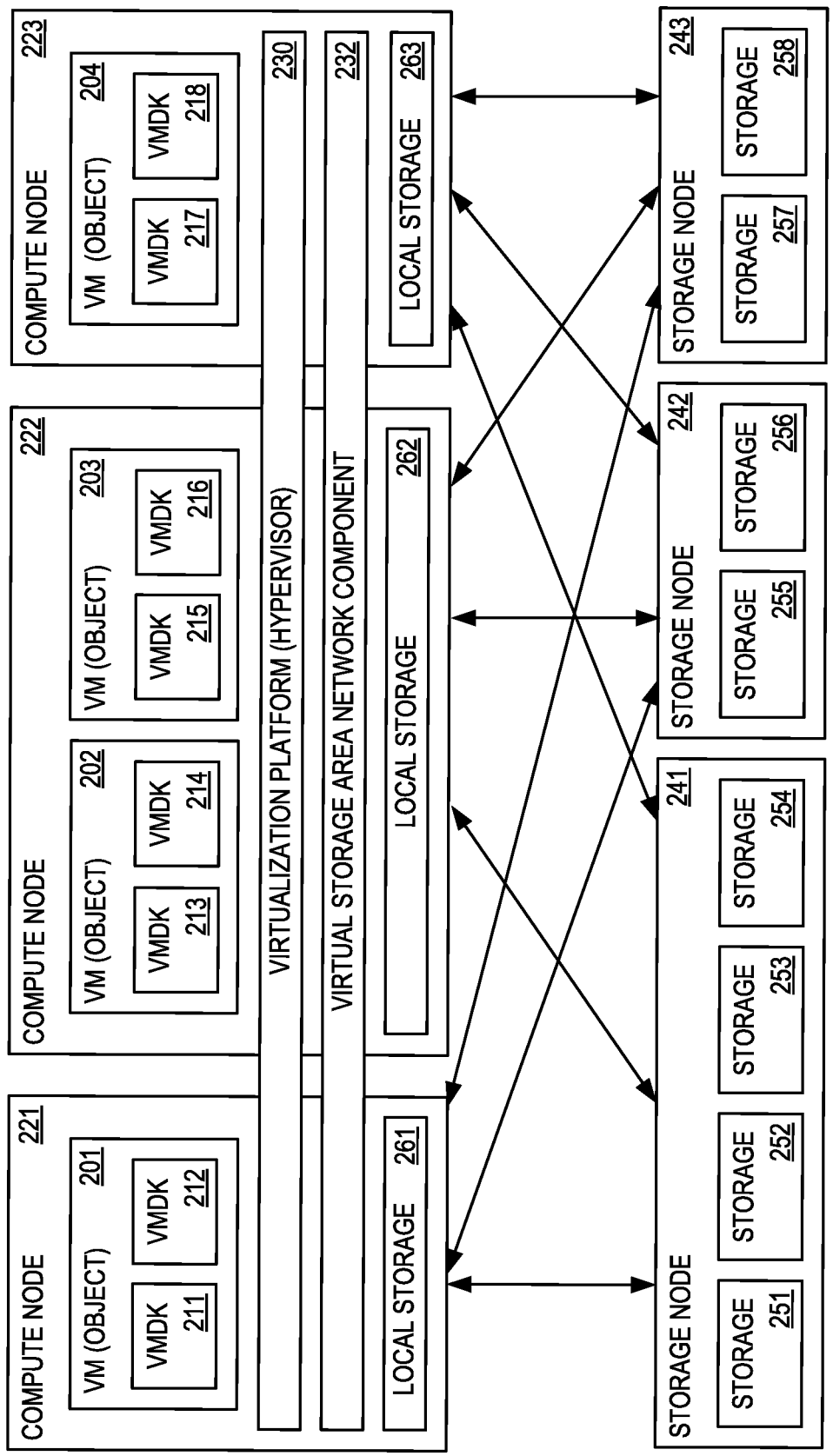
FIG. 2 illustrates further detail for an example of an architecture that may be used.

Examples of architecture 100 are operable with virtualized and non-virtualized storage solutions. FIG. 2 illustrates a virtualization architecture 200 that may be used as a component of architecture 100. Virtualization architecture 200 is comprised of a set of compute nodes 221-223, interconnected with each other and a set of storage nodes 241-243 according to an embodiment. In other examples, a different number of compute nodes and storage nodes may be used. Each compute node hosts multiple objects, which may be virtual machines, containers, applications, or any compute entity (e.g., computing instance or virtualized computing instance) that consumes storage. A virtual machine includes, but is not limited to, a base object, linked clone, independent clone, and the like. A compute entity includes, but is not limited to, a computing instance, a virtualized computing instance, and the like.

When objects are created, they may be designated as global or local, and the designation is stored in an attribute. For example, compute node 221 hosts object 201, compute node 222 hosts objects 202 and 203, and compute node 223 hosts object 204. Some of objects 201-204 may be local objects. In some examples, a single compute node may host 50, 100, or a different number of objects. Each object uses a VMDK, for example VMDKs 211-218 for each of objects 201-204, respectively. Other implementations using different formats are also possible. A virtualization platform 230, which includes hypervisor functionality at one or more of compute nodes 221, 222, and 223, manages objects 201-204. In some examples, various components of virtualization architecture 200, for example compute nodes 221, 222, and 223, and storage nodes 241, 242, and 243 are implemented using one or more computing apparatus such as computing apparatus 1118 of FIG. 11.

Virtualization software that provides software-defined storage (SDS), by pooling storage nodes across a cluster, creates a distributed, shared datastore, for example a SAN. Thus, objects 201-204 may be virtual SAN (vSAN) objects. In some distributed arrangements, servers are distinguished as compute nodes (e.g., compute nodes 221, 222, and 223) and storage nodes (e.g., storage nodes 241, 242, and 243). Although a storage node may attach a large number of storage devices (e.g., flash, solid state drives (SSDs), non-volatile memory express (NVMe), Persistent Memory (PMEM), quad-level cell (QLC)) processing power may be limited beyond the ability to handle input/output (I/O) traffic. Storage nodes 241-243 each include multiple physical storage components, which may include flash, SSD, NVMe, PMEM, and QLC storage solutions. For example, storage node 241 has storage 251, 252, 253, and 254: storage node 242 has storage 255 and 256; and storage node 243 has storage 257 and 258. In some examples, a single storage node may include a different number of physical storage components.

In the described examples, storage nodes 241-243 are treated as a SAN with a single global object, enabling any of objects 201-204 to write to and read from any of storage 251-258 using a virtual SAN component 232. Virtual SAN component 232 executes in compute nodes 221-223. Using the disclosure, compute nodes 221-223 are able to operate with a wide range of storage options. In some examples, compute nodes 221-223 each include a manifestation of virtualization platform 230 and virtual SAN component 232. Virtualization platform 230 manages the generating, operations, and clean-up of objects 201-204. Virtual SAN component 232 permits objects 201-204 to write incoming data from object 201-204 to storage nodes 241, 242, and/or 243, in part, by virtualizing the physical storage components of the storage nodes.

In general, any of objects 300-300c of architecture 100 may correspond to any of objects 201-204, each with one or more VMDKs. In some examples, objects 300-300c of architecture 100 instead correspond to VMDKs 211-218.

Figure 3:
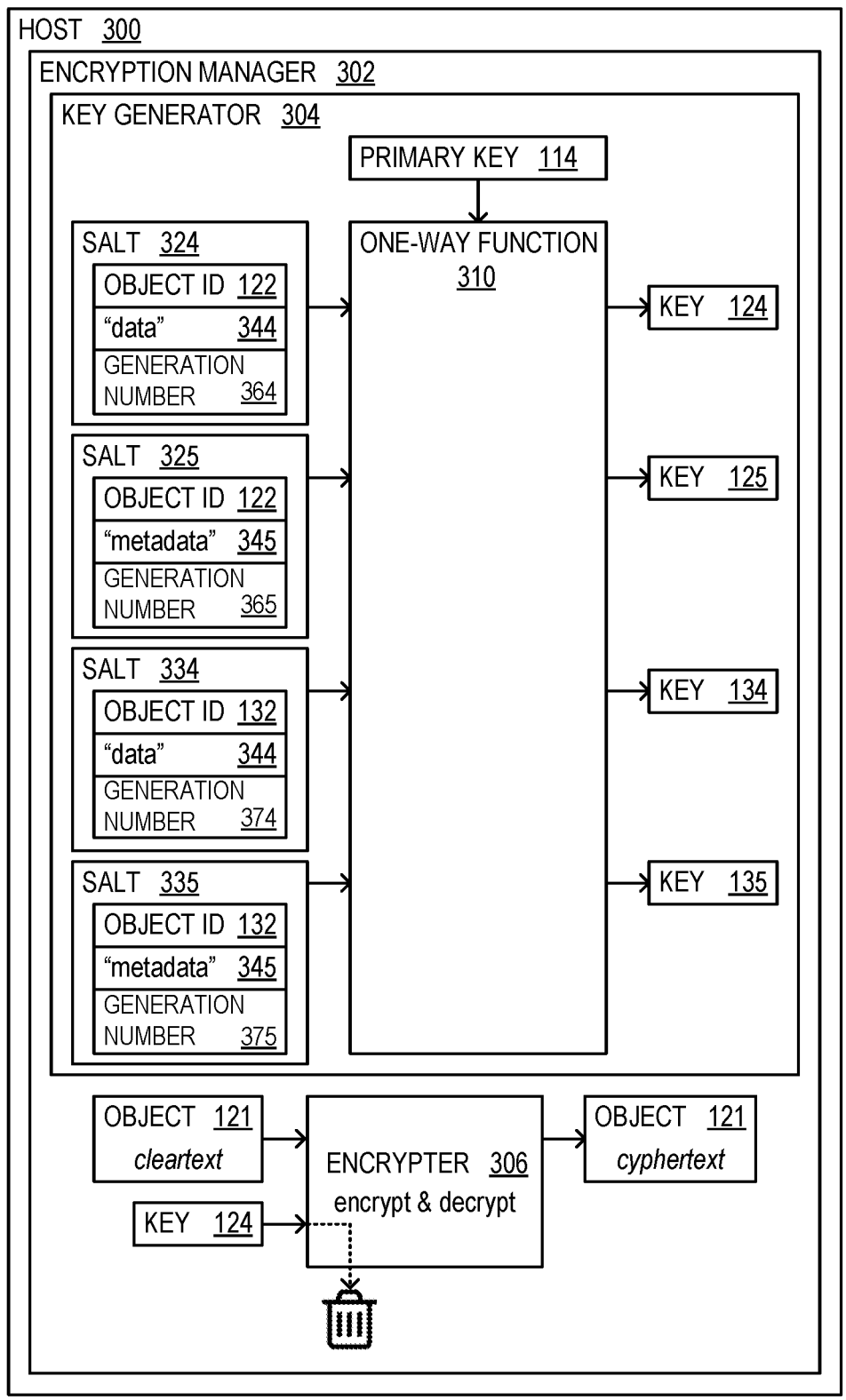
FIG. 3 illustrates further detail for a component of the example architecture of FIG. 1.

FIG. 3 illustrates further detail for host 300, specifically further detail for encryption manager 302. Key generator 304 has one-way function 310 that may be a hash function, such as a member of the secure hash algorithm (SHA) family (e.g., the SHA-512). One-way function 310 generates encryption keys by accepting an input and outputting a message digest (hash value) as the encryption key.

For example, one-way function 310 generates data encryption key 124 by accepting a concatenation of primary encryption key 114 and a data salt 324 as an input. The concatenation may be in any order. Data salt 324 is shown to include object ID 122, a data salt string 344, and a generation number 364, although any order of the components may be used. Some examples do not use generation numbers in salts for data objects. Data salt string 344 is shown as the word "data", although any string could be used that is different for data objects versus metadata (e.g., metadata 123).

One-way function 310 generates metadata encryption key 125 by accepting a concatenation of primary encryption key 114 and a metadata salt 325 as an input. The concatenation may be in any order. Metadata salt 325 is shown to include object ID 122, a metadata salt string 345, and a generation number 365, although any order of the components may be used. Some examples do not use generation numbers in salts for metadata. Metadata salt string 345 is shown as the word "metadata", although any string could be used that is different for metadata versus data objects (e.g., object 121).

One-way function 310 generates data encryption key 134 by accepting a concatenation of primary encryption key 114 and a data salt 334 as an input. The concatenation may be in any order, but may be limited to being in the same order as for generating data encryption key 124. Data salt 334 is shown to include object ID 132, data salt string 344, and a generation number 374, although any order of the components may be used. One-way function 310 generates metadata encryption key 135 by accepting a concatenation of primary encryption key 114 and a metadata salt 335 as an input. The concatenation may be in any order, but may be limited to being in the same order as for generating metadata encryption key 125. Metadata salt 335 is shown to include object ID 132, metadata salt string 345, and a generation number 375, although any order of the components may be used.

Encrypter 306, which performs both encryption (turning cleartext into cyphertext) and decryption (turning cyphertext into cleartext) is shown encrypting object 121 with data encryption key 134. The process is that, upon a signal that object 121 is to be stored, such as after creation or use, key generator 304 generates data encryption key 134. Encrypter 306 then encrypts object 121 using data encryption key 134, and deletes data encryption key 134 from memory. Data encryption key 134 is not persisted (stored) or retained longer than necessary, in some examples. Object 121 is then stored in its encrypted state.

Upon a signal that object 121 is to be retrieved from storage, such as for use or transmittal to user terminal 102, object 121 is read from memory in its encrypted state. Key generator 304 generates data encryption key 134. Encrypter 306 then decrypts object 121 using data encryption key 134, and deletes data encryption key 134 from memory. Object 121 is then available in memory for use in its unencrypted state.

Encryption and decryption of metadata 123 (using metadata encryption key 125), object 131 (using data encryption key 134), and metadata 133 (using metadata encryption key 135) are handled similarly as described for object 121.

Figure 4:
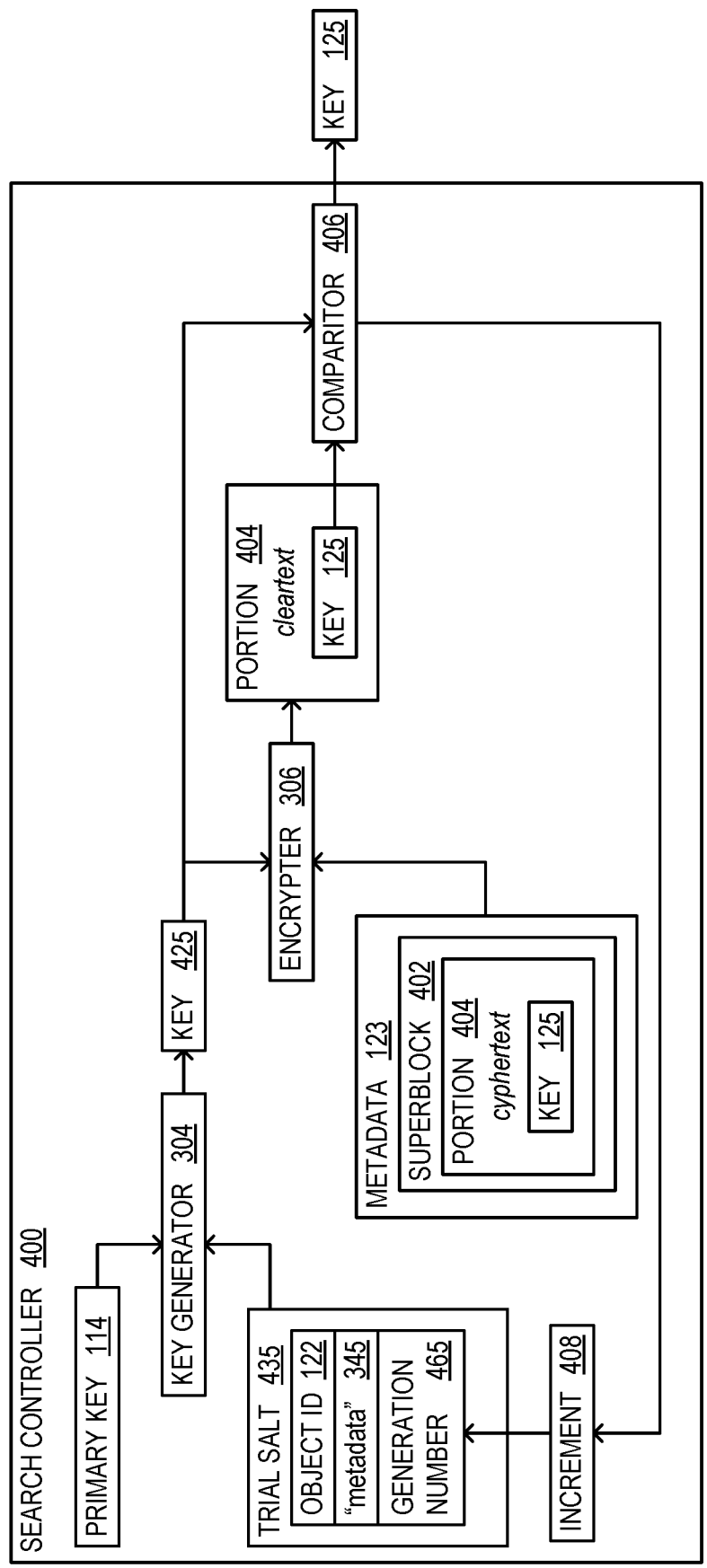
FIG. 4 illustrates an example of a key search workflow that may occur within an example architecture, such as that of FIG. 1.

FIG. 4 illustrates an example of a key search workflow by search controller 400. A trial-and-error key search is performed when a generation number is used but unknown. A search for a generation number used to produce metadata encryption key 125 is demonstrated. Searches for generation numbers used to produce other keys 124, 134, and 135 is similar. An initial version of a trial generation number 465 is set, such as 0 or 1, and placed into a trial metadata salt 435. Trial metadata salt 435 is similar to metadata salt 325, except the generation number is replaced with a trial version.

Trial metadata salt 435 is concatenated (or otherwise combined) with primary encryption key 114 and provided to key generator 304 to generate a trial metadata encryption key 425. Trial metadata encryption key 425 is provided to encrypter 306 to decrypt a portion 404 of a superblock 402 within metadata 123. In some examples, superblock 402 is 4 kilobytes (KB) and/or contains information for bootstrapping a VMDK (object 121).

Superblock 402 contains a copy of the current version (generation) metadata encryption key 125 that had been placed there before metadata 123 (and thus superblock 402) had been encrypted with metadata encryption key 125. Decrypting portion 404 is decrypting a portion of metadata 123 because superblock 402 is within metadata 123. If trial metadata encryption key 425 is different that metadata encryption key 125, portion 404 will not decrypt properly, but will instead be useless. A decryption candidate version of metadata encryption key 125 is sent to a comparator 406 for comparison with trial metadata encryption key 425 and there will not be a match. An incrementer 408 increments (or otherwise increases or changes) trial generation number 465, and a new version of trial metadata encryption key 425 is generated.

These trials continue until metadata encryption key 425 does match metadata encryption key 125, because trial generation number 465 reaches the value of the version of generation number 365 that had been used to generate the current version of metadata encryption key 125. Portion 404 now decrypts properly. This is detected when comparator 406 determines that the decryption candidate version of metadata encryption key 125 matches trial metadata encryption key 425. Trial metadata encryption key 425 is output as the recovered version of metadata encryption key 125. The recovered version of metadata encryption key 125 is used to decrypt the remainder of metadata 123.

Trial generation number 465 is increased (e.g., incremented) due to a rekey event to create a new version of metadata salt 325 to be used for generating a new version (next generation) of metadata encryption key 125. This new version of metadata encryption key 125 is placed within superblock 402 (replacing the prior version, or earlier generation of metadata encryption key 125) before metadata 123 is encrypted again. A rekey event may be triggered by a hacking event, a key exposure event, or on some schedule. If rekeying events are relatively rare, the search process for a key will not be overly burdensome.

In some scenarios, metadata encryption keys may be exposed more often than data encryption keys and so generation numbers and key searching is performed for metadata, but not data objects. In some examples, both data encryption keys and metadata encryption keys use generation numbers. In general, there are different reasons for accessing metadata versus data objects, and metadata encryption keys may be exposed more often, or to more different people, and so it is preferable to manage security differently for metadata then for its corresponding data.

Figure 5:
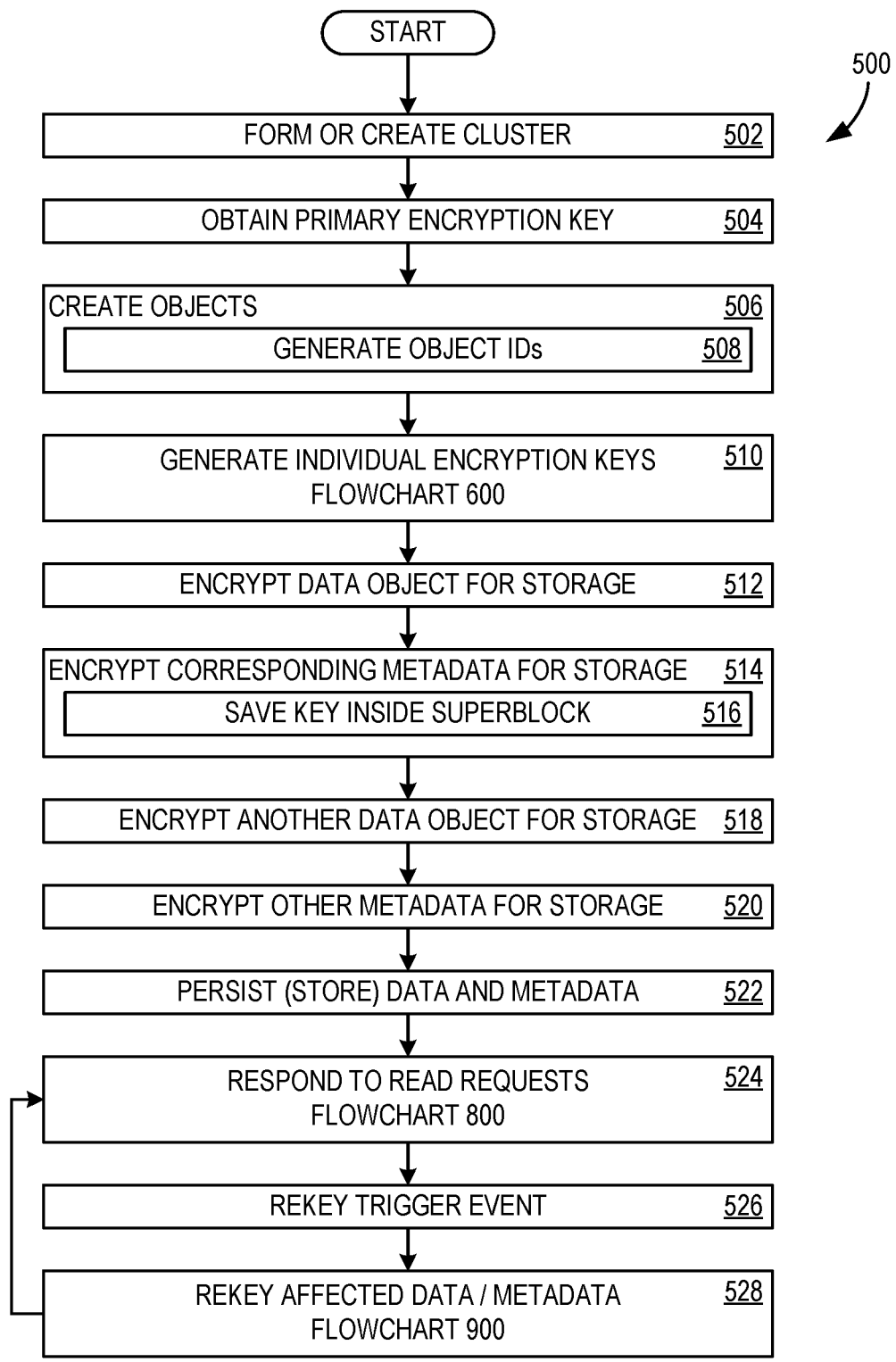
FIGS. 5-10 illustrate examples of various flowcharts of exemplary operations associated with an example architecture, such as that of FIG. 1.

FIG. 5 illustrates a flowchart 500 of exemplary operations that may be performed by examples of architecture 100. In some examples, the operations of flowchart 500 are performed by one or more computing apparatus 1118 of FIG. 11. Flowchart 500 commences with forming or creating cluster 110 in operation 502 and obtaining primary encryption key 114 in operation 504. In some examples, primary encryption key 114 is a cluster level key, such as a master encryption key for cluster 110. In general, a cluster-level encryption key will be created before creating any object in a cluster.

Operation 506 creates object 121 and object 131. In some examples, objects 121 and 131 each comprises a VMDK. When a VMDK, or some other object (in some scenarios) is created, it is assigned a unique object ID. So operation 506 includes operation 508, which generates object ID 122 and object ID 132. Another part of the object creation process is to generate encryption keys which is performed in operation 510, using flowchart 600 of FIG. 6 (described below).

Operation 512 encrypts object 121 for storage, using data encryption key 124. This provides protection for data at rest. Metadata 123 is encrypted using metadata encryption key 125, in operation 514. In some examples, metadata encryption key 125 is saved within superblock 402 in operation 516, so that encrypting metadata 123 using metadata encryption key 125 also comprises encrypting superblock 402 using metadata encryption key 125. Operation 518 encrypts object 131 using data encryption key 134, and operation 520 encrypts metadata 133 using metadata encryption key 135, in a similar fashion to operation 514 (including possibly saving metadata encryption key 135 within a superblock within metadata 133. In some examples, data encryption key 124, metadata encryption key 125, data encryption key 134, and metadata encryption key 135 are all deleted in operation 522, to reduce the risk of compromise.

The encrypted versions of objects 121 and 131, and metadata 123 and 133 are persisted (stored) in operation 522, if they had not been stored earlier (e.g., in operations 516 or 520). Persisting the encrypted objects 121 and 131 and metadata 123 and 133 may comprise saving them using virtual storage area network 232.

Read requests from user terminal 102 (e.g., read requests 104 and 105) are handled in operation 524 using flowchart 800 of FIG. 8 (described below). In some examples, keys are generated at the time of object instantiation and destroyed upon object exit (or destruction). This avoids the cost of key generation for every time an object (or metadata) is retrieved from storage. However, in other examples, any of data encryption key 124, metadata encryption key 125, data encryption key 134, and metadata encryption key 135 might not be retained.

Operation 526 represents a rekey trigger event (rekey trigger event 526). In some scenarios, a rekey trigger event may be a key disclosure event, a suspected key compromise event (e.g., a data breach or other hacker activity), or even a lapse of time. Operation 528 rekeys the affected objects and metadata using flowchart 900 of FIG. 9 (described below).

Figure 6:
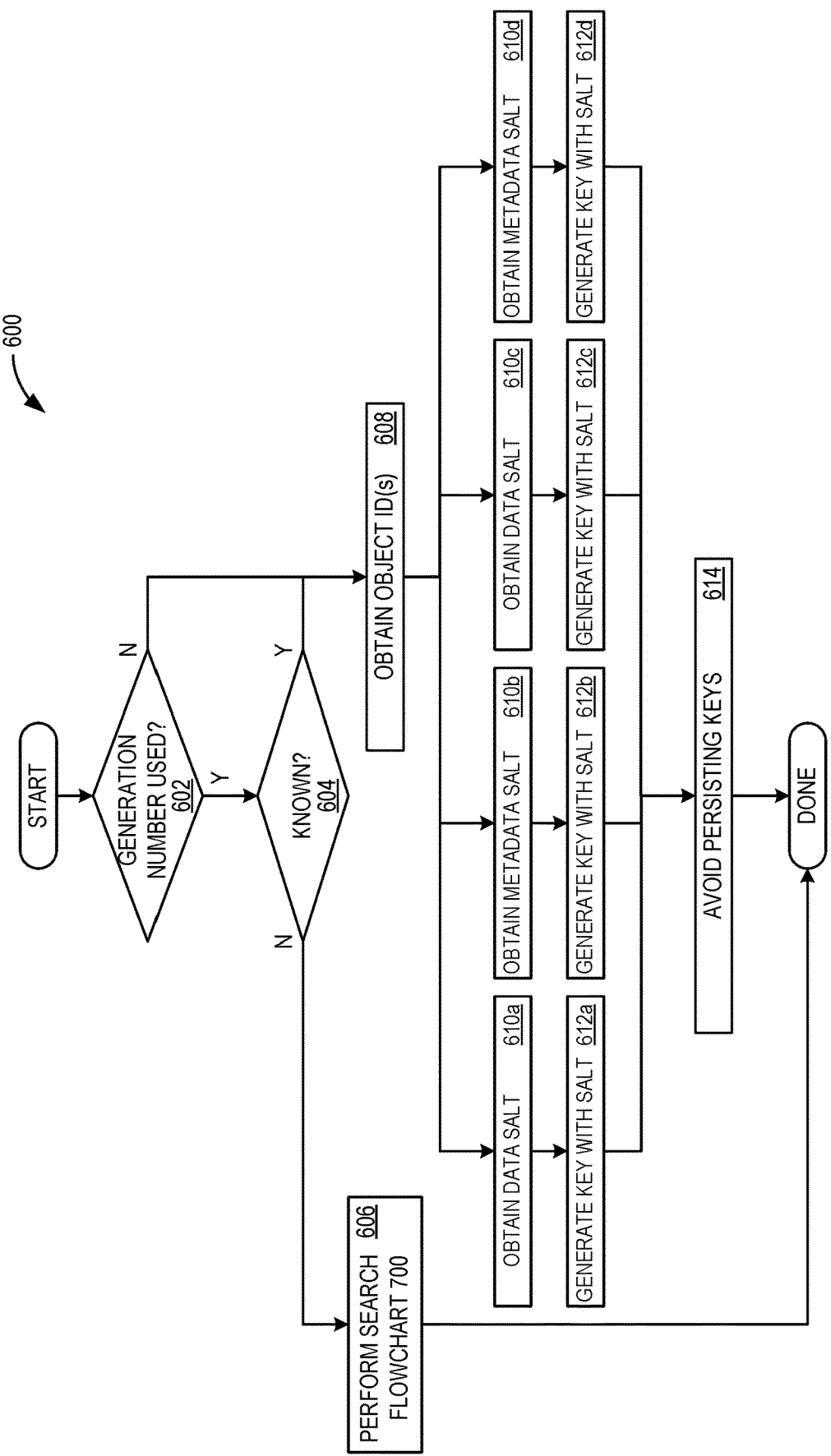

FIG. 6 illustrates a flowchart 600 of exemplary operations that may be performed by examples of architecture 100. In some examples, the operations of flowchart 600 are performed by one or more computing apparatus 1118 of FIG. 11. Flowchart 600 commences with decision operation 602, which selects a branch of flowchart 600 based on whether a generation number is to be used in generating a key. If not, flowchart 600 moves to operation 608. Otherwise, decision operation 604 determines whether the current generation number is known. Some examples may specifically avoid storing generation numbers and determine generation numbers when they are needed, using flowchart 700 of FIG. 7 (described below). So, if the generation number is not known, flowchart 600 moves to operation 606, which executed flowchart 700.

If the generation number is known, or one is not used, flowchart 600 is now at operation 608, which obtains (e.g., retrieves) object ID 122 and/or object ID 132, based on which encryption keys need to be generated. Initially, upon creation of objects 121 and 131, keys for each of object 121, metadata 123, object 131, and metadata 133 are needed. However, in subsequent passes through flowchart 600, for example, if a read request for only one or two of object 121, metadata 123, object 131, and metadata 133 is received, then flowchart 600 only takes the required path(s) through operations 610*a*-612*a*, 610*b*-612*b*, 610*c*-612*c*, and 610*d*-612*d*.

Operations 610*a*-612*a* generate data encryption key 124. Operation 610*a* obtains data salt 324 comprising object ID 122 and data salt string 344, and operation 612*a* generates data encryption key 124 using primary encryption key 114, data salt 324, and one-way function 310. Operations 610*b*-612*b* generate metadata encryption key 125. Operation 610*b* obtains metadata salt 325 comprising object ID 122 and metadata salt string 345. Metadata salt string 345 differs from data salt string 344. Operation 612*b* generates metadata encryption key 125 using primary encryption key 114, metadata salt 325, and one-way function 310.

Operations 610*c*-612*c* generate data encryption key 134. Operation 610*c* obtains data salt 334 comprising object ID 132 and data salt string 344, and operation 612*c* generates data encryption key 134 using primary encryption key 114, data salt 334, and one-way function 310. Operations 610*d*-612*d* generate metadata encryption key 135. Operation 610*d* obtains metadata salt 335 comprising object ID 132 and metadata salt string 345. Metadata salt string 345 differs from data salt string 344. Operation 612*d* generates metadata encryption key 135 using primary encryption key 114, metadata salt 335, and one-way function 310.

Operation 614 represents not persisting any of data encryption key 124, metadata encryption key 125, data encryption key 134, and metadata encryption key 135, and/or not persisting any of generation numbers 364, 365, 374, and 375 at any point during the operations of flowcharts 500, 600, 700, 800, and 900—except for possibly storing an encrypted key within a superblock for the purpose of generation number searching (see FIG. 4 and its explanation, and operation 516 of flowchart 500).

Figure 7:
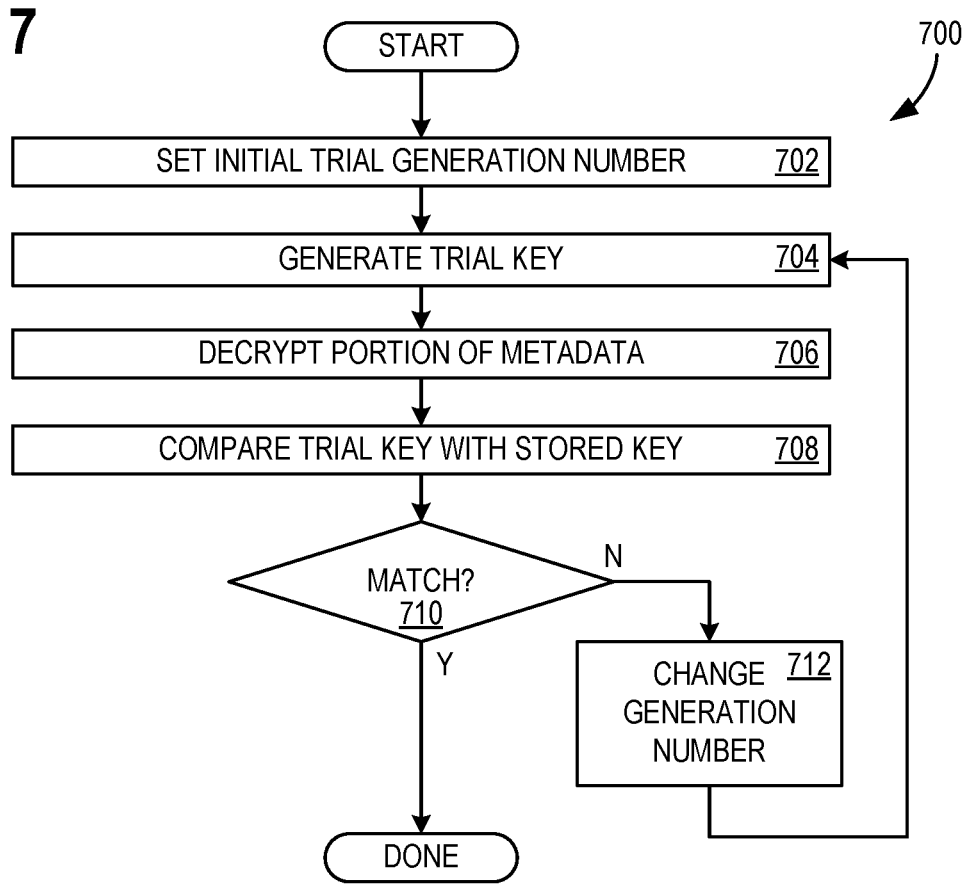

FIG. 7 illustrates a flowchart 700 of exemplary operations that may be performed by examples of architecture 100. In some examples, the operations of flowchart 700 are performed by one or more computing apparatus 1118 of FIG. 11. Flowchart 700 is described with regard to metadata encryption key 125, but could be performed for any of the other keys (e.g., data encryption key 124, data encryption key 134, and metadata encryption key 135).

Flowchart 700 sets the initial trial generation number 465 to some value (e.g., 0 or 1) in operation 702, and then iterates through operations 704-712 until determining (in decision operation 710) that trial metadata encryption key 425 matches metadata encryption key 125. Operation 704 generates trial metadata encryption key 425 using primary encryption key 114, trial metadata salt 435, and one-way function 310, using operations 608-614 of flowchart 600.

Operation 706 decrypts at least portion 404 of metadata 123 using trial metadata encryption key 425. Portion 404 of metadata 123 is within superblock 402, and in some scenarios, operation 706 decrypts the entirety of metadata 123 in order to extract portion 404. Operation 708 compares portion 404 of metadata 123 with trial metadata encryption key 425.

Decision operation 710 determines whether there is a match. If portion 404 had decrypted properly, it is (or contains) metadata encryption key 125 which necessarily matches trial metadata encryption key 425 (or otherwise, portion 404 would not have decrypted properly). This value is reported out of flowchart 700 as metadata encryption key 125 (which is also the current trial metadata encryption key 465). Otherwise, if trial metadata encryption key 425 does not match metadata encryption key 125 (e.g., portion 404 did not decrypt properly), operation 712 changes trial generation number 465 (e.g., by incrementing or otherwise increasing) and flowchart 700 returns to operation 704.

Figure 8:
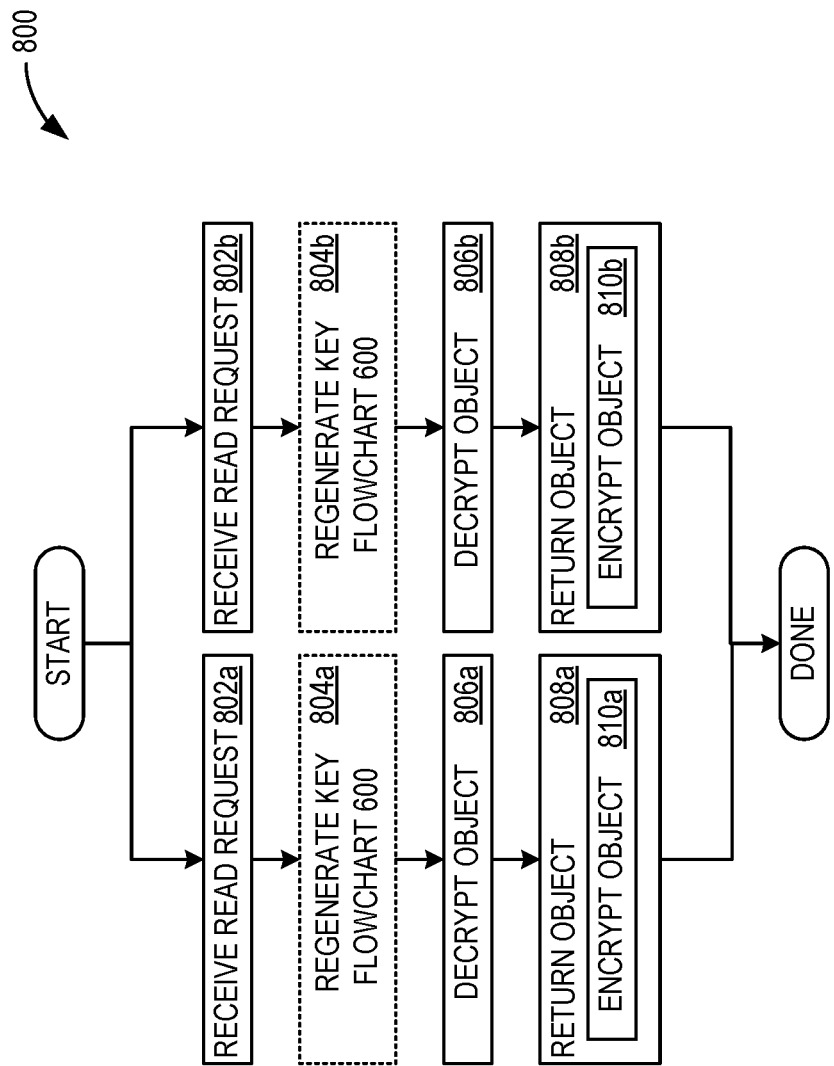

FIG. 8 illustrates a flowchart 800 of exemplary operations that may be performed by examples of architecture 100. In some examples, the operations of flowchart 800 are performed by one or more computing apparatus 1118 of FIG. 11. Flowchart 800 takes one of branches 802*a*-810*a*, 802*b*-810*b*, 802*c*-810*c*, and 802*d*-810*d*, based on the read request that is received.

Read request 104 for object 121 is received in operation 802*a*. Some examples retain keys 124, 125, 134, and 134 in memory, to avoid regenerating keys every time an object or metadata is retrieved from storage. However, in examples that do not retain keys, operations 804*a* and 804*b* are required. Based on at least receiving read request 104, operation 804*a* regenerates data encryption key 124 using primary encryption key 114, data salt 324, and one-way function 310, and flowchart 600 of FIG. 6. Operation 806*a* decrypts object 121 using data encryption key 124, and operation 808*a* returns object 121. In some examples, returning object 121 comprises encrypting object 121 for transit using transit encryption key 103, in operation 810*a*.

Read request 105 for object 131 is received in operation 802*b*. Based on at least receiving read request 105, operation 804*b* regenerates data encryption key 134 using primary encryption key 114, data salt 334, and one-way function 310, and flowchart 600. Operation 806*b* decrypts object 131 using data encryption key 134, and operation 808*b* returns object 131. In some examples, returning object 131 comprises encrypting object 131 for transit using transit encryption key 103, in operation 810*b*. Reading metadata 123 and 133 from storage is similar, regenerating metadata encryption keys 125 and 135, respectively. If metadata 123 or 133 needs to be transmitted, it can also be encrypted, using transit encryption key 103.

Figure 9:
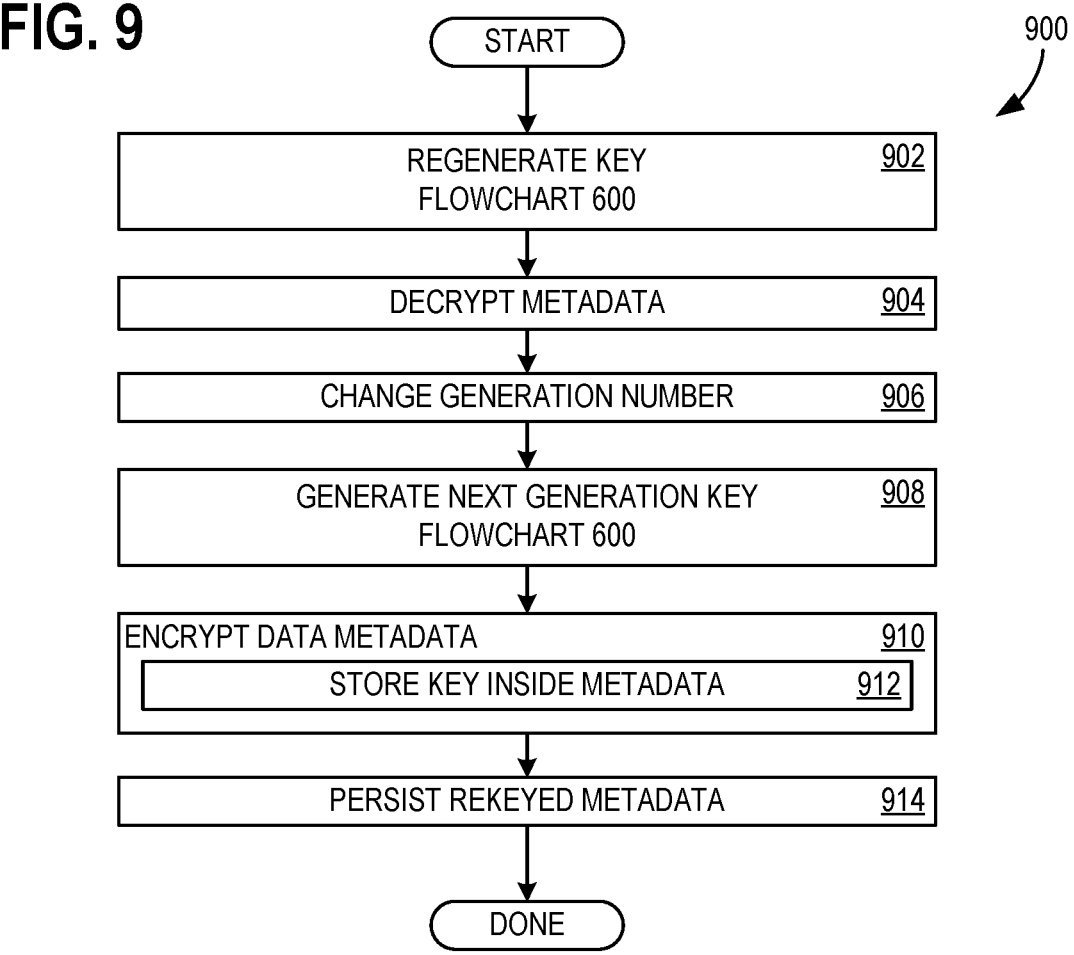

FIG. 9 illustrates a flowchart 900 of exemplary operations that may be performed by examples of architecture 100. In some examples, the operations of flowchart 900 are performed by one or more computing apparatus 1118 of FIG. 11. Flowchart 900 is described for the scenario of rekeying metadata 123, but the operations described here could also be used to rekey object 121, object 131, or metadata 133. Flowchart 900 commences based upon at least rekey trigger event 526, and regenerates metadata encryption key 125 using primary encryption key 114, metadata salt 325, and one-way function 310 in operation 902. Operation 902 uses flowchart 600 of FIG. 6.

Operation 904 decrypts metadata 123 using metadata encryption key 125, and operation 906 changes generation number; 365 (e.g., incrementing or otherwise increasing). Operation 908 generates a new version of metadata encryption key 125 using primary encryption key 114, metadata salt 325 with the changed generation number 365, and one-way function 310, using flowchart 600. Operation 910 encrypts metadata 123 using the new version of metadata encryption key 125, and in some examples stores the new version of metadata encryption key 125 within metadata 123 before encrypting, in operation 912. Operation 914 (which may be considered part of operation 912, in some examples) persists the re-keyed metadata 123 (or rekeyed object 121 or other data object or metadata).

Figure 10:
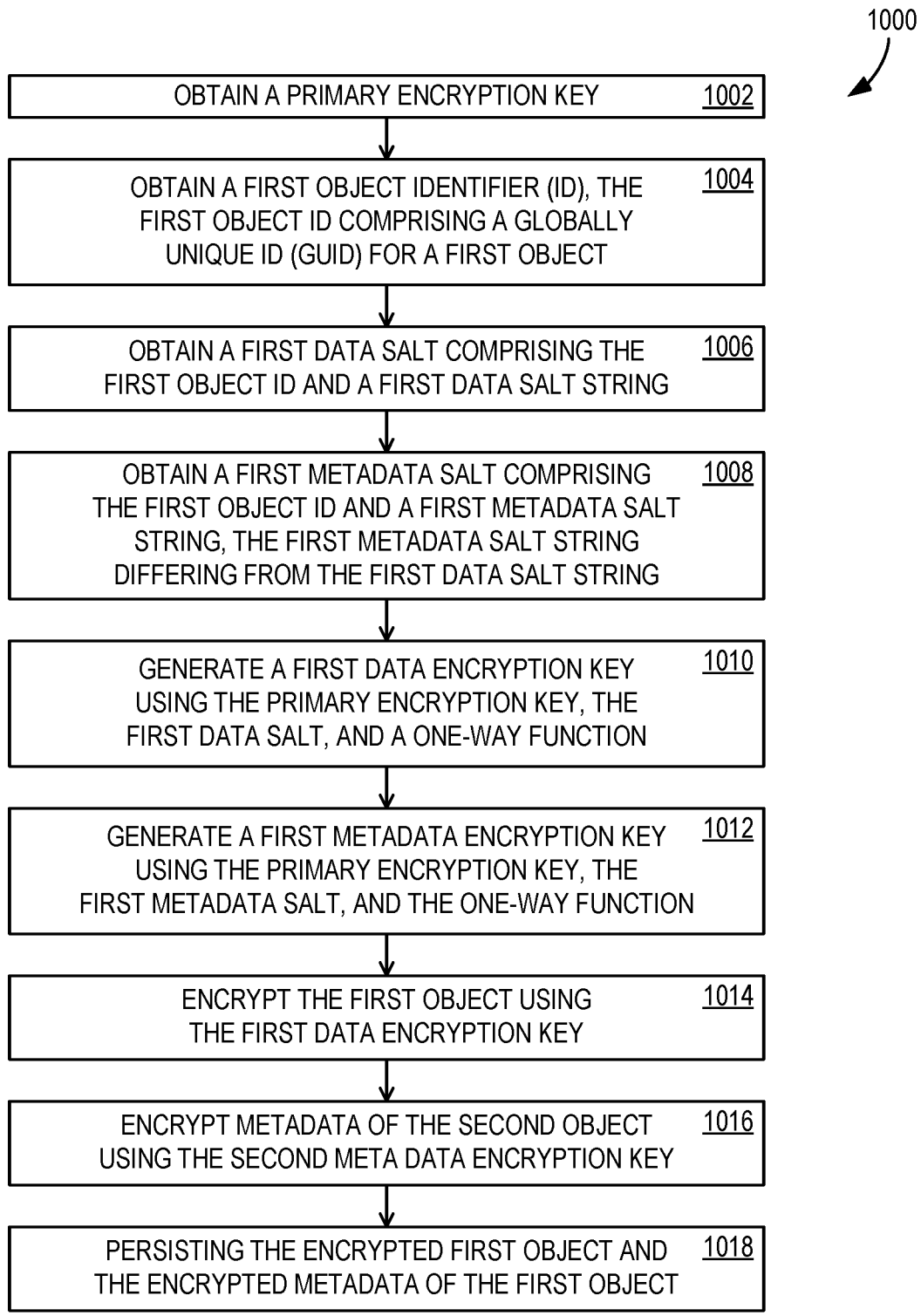

FIG. 10 illustrates a flowchart 1000 of exemplary operations associated with architecture 100. In some examples, the operations of flowchart 1000 are performed by one or more computing apparatus 1118 of FIG. 11. Flowchart 1000 commences with operation 1002, which includes obtaining a primary encryption key. Operation 1004 includes obtaining a first object ID, the first object ID comprising a GUID for a first object.

Operation 1006 includes obtaining a first data salt comprising the first object ID and a first data salt string. Operation 1008 includes obtaining a first metadata salt comprising the first object ID and a first metadata salt string, the first metadata salt string differing from first data salt string. Operation 1010 includes generating a first data encryption key using the primary encryption key, the first data salt, and a one-way function. Operation 1012 includes generating a first metadata encryption key using the primary encryption key, the first metadata salt, and the one-way function. Operation 1014 includes encrypting the first object using the first data encryption key. Operation 1016 includes encrypting metadata of the first object using the first metadata encryption key. Operation 1018 includes persisting the encrypted first object and the encrypted metadata of the first object.

ADDITIONAL EXAMPLES

An example computerized method comprises: obtaining a primary encryption key: obtaining a first object ID, the first object ID comprising a GUID for a first object; obtaining a first data salt comprising the first object ID and a first data salt string: obtaining a first metadata salt comprising the first object ID and a first metadata salt string, the first metadata salt string differing from first data salt string: generating a first data encryption key using the primary encryption key, the first data salt, and a one-way function: generating a first metadata encryption key using the primary encryption key, the first metadata salt, and the one-way function: encrypting the first object using the first data encryption key; encrypting metadata of the first object using the first metadata encryption key; and persisting the encrypted first object and the encrypted metadata of the first object.

An example computer system comprises: a processor; and a non-transitory computer readable medium having stored thereon program code executable by the processor, the program code causing the processor to: obtain a primary encryption key: obtain a first object ID, the first object ID comprising a GUID for a first object: obtain a first data salt comprising the first object ID and a first data salt string: obtain a first metadata salt comprising the first object ID and a first metadata salt string, the first metadata salt string differing from first data salt string: generate a first data encryption key using the primary encryption key, the first data salt, and a one-way function: generate a first metadata encryption key using the primary encryption key, the first metadata salt, and the one-way function: encrypt the first object using the first data encryption key; and encrypt metadata of the second object using the second metadata encryption key.

An example encryption manager comprises: a key generator for obtaining a primary encryption key, a first object ID comprising a GUID for a first object, a first data salt comprising the first object ID and a first data salt string, and a first metadata salt comprising the first object ID and a first metadata salt string and which differs from first data salt string; and generating a first data encryption key using the primary encryption key, the first data salt, and a one-way function, and generating a first metadata encryption key using the primary encryption key, the first metadata salt, and the one-way function; and an encrypter for encrypting the first object using the first data encryption key and encrypting metadata of the first object using the first metadata encryption key.

Alternatively, or in addition to the other examples described herein, examples include any combination of the following:
  persisting the encrypted first object and the encrypted metadata of the first object;
  obtaining a second object ID, the second object ID comprising a GUID for a second object;
  obtaining a second data salt comprising the second object ID and a second data salt string;
  obtaining a second metadata salt comprising the second object ID and a second metadata salt string;
  the second metadata salt string differs from second data salt string;
  generating a second data encryption key using the primary encryption key, the second data salt, and the one-way function;
  generating a second metadata encryption key using the primary encryption key, the second metadata salt, and the one-way function;
  encrypting the second object using the second data encryption key;
  encrypting metadata of the second object using the second metadata encryption key;
  the first object comprises a VMDK;
  the second object comprises a VMDK;
  receiving a first read request for the first object;
  based on at least receiving the first read request, regenerating the first data encryption key using the primary encryption key, the first data salt, and the one-way function;
  based on at least receiving the first read request, decrypting the first object using the first data encryption key;
  based on at least receiving the first read request, returning the first object;
  receiving a second read request for the metadata of the first object;
  based on at least receiving the second read request, regenerating the first metadata encryption key using the primary encryption key, the first metadata salt, and the one-way function;
  based on at least receiving the second read request, decrypting the metadata of the first object using the first metadata encryption key;
  based on at least receiving the second read request, returning the metadata of the first object;
  receiving a third read request for the second object;
  based on at least receiving the third read request, regenerating the second data encryption key using the primary encryption key, the second data salt, and the one-way function;
  based on at least receiving the third read request, decrypting the second object using the second data encryption key;
  based on at least receiving the third read request, returning the second object;
  receiving a fourth read request for the metadata of the second object;
  based on at least receiving the fourth read request, regenerating the second metadata encryption key using the primary encryption key, the second metadata salt, and the one-way function;
  based on at least receiving the fourth read request, decrypting the metadata of the second object using the second metadata encryption key;
  based on at least receiving the fourth read request, returning the metadata of the second object;
  the first metadata salt string further comprises a generation number;
  based upon at least a rekey trigger event, regenerating the first metadata encryption key using the primary encryption key, the first metadata salt, and the one-way function;
  based upon at least a rekey trigger event, decrypting the metadata of the first object using the first metadata encryption key;
  based upon at least a rekey trigger event, changing the generation number;

based upon at least a rekey trigger event, generating a third metadata encryption key using the primary encryption key, the first metadata salt with the changed generation number, and the one-way function;
based upon at least a rekey trigger event, encrypting the metadata of the first object using the third metadata encryption key;
regenerating the first metadata encryption key comprises:
until determining that a trial metadata encryption key matches the first metadata encryption key, generating a trial metadata salt comprising the first object ID, the metadata salt string, and a trial generation number;
generating the trial metadata encryption key using the primary encryption key, the trial metadata salt, and the one-way function;
if the trial metadata encryption key does not match the first metadata encryption key, changing the trial generation number;
determining that the trial metadata encryption key matches the first metadata encryption key comprises decrypting at least a portion of the metadata of the first object using the trial metadata encryption key;
determining that the trial metadata encryption key matches the first metadata encryption key further comprises comparing the portion of the metadata of the first object with a known value;
persisting the encrypted first object and the encrypted metadata of the first object comprises storing the encrypted first object and the encrypted metadata of the first object using a virtual storage area network;
the primary encryption key is a cluster level key;
the cluster level key is a master encryption key for a cluster of hosts;
creating the first object;
creating the second object;
generating the first object ID for the first object;
generating the second object ID for the second object;
the first data salt string comprises "data";
the first metadata data salt string comprises "metadata";
the second data salt string equals the first data salt string;
the second metadata salt string equals the first metadata salt string;
the first data salt comprises a concatenation of the first object ID and the first data salt string;
the first data salt comprises a concatenation, in any order, of the first object ID, the first data salt string, and a generation number;
the first metadata salt comprises a concatenation of the first object ID and the first metadata salt string;
the first metadata salt comprises a concatenation, in any order, of the first object ID, the first metadata salt string, and a generation number;
the second data salt comprises a concatenation of the second object ID and the second data salt string;
the second data salt comprises a concatenation, in any order, of the second object ID, the second data salt string, and a generation number;
the second metadata salt comprises a concatenation of the second object ID and the second metadata salt string;
the second metadata salt comprises a concatenation, in any order, of the second object ID, the second metadata salt string, and a generation number;
the one-way function comprises a hash function;
the one-way function comprises a hash function of the secure hash algorithm (SHA) family;
the one-way function comprises a SHA-512 function;
generating the first data encryption key comprises passing a concatenation of the primary encryption key and the first data salt through the one-way function;
the first data encryption key comprises a message digest of the one-way function;
generating the first metadata encryption key comprises passing a concatenation of the primary encryption key and the first metadata salt through the one-way function;
the first metadata encryption key comprises a message digest of the one-way function;
generating the second data encryption key comprises passing a concatenation of the primary encryption key and the second data salt through the one-way function;
the second data encryption key comprises a message digest of the one-way function;
generating the second metadata encryption key comprises passing a concatenation of the primary encryption key and the second metadata salt through the one-way function;
the second metadata encryption key comprises a message digest of the one-way function;
not persisting any of the first data encryption key, the first metadata encryption key, the second data encryption key, and the second metadata encryption key;
not persisting any generation number;
returning the first object comprises encrypting the first object for transit using a different encryption key than the first data encryption key;
returning the metadata for the first object comprises encrypting the metadata for the first object for transit using a different encryption key than the first metadata encryption key;
returning the second object comprises encrypting the second object for transit using a different encryption key than the second data encryption key;
returning the metadata for the second object comprises encrypting the metadata for the second object for transit using a different encryption key than the second metadata encryption key;
the rekey trigger event comprises an event selected from the list consisting of: a lapse of time: a key disclosure event, and a suspected key compromise event;
the first data salt string further comprises a generation number;
the second data salt string further comprises a generation number
the second metadata salt string further comprises a generation number
changing the generation number comprises increasing the generation number;
changing the generation number comprises incrementing the generation number;
changing the trial generation number comprises increasing the trial generation number;
changing the trial generation number comprises incrementing the trial generation number;
the portion of the metadata of the first object is within a superblock;
the known value is the trial metadata encryption key;
saving the first metadata encryption key within the superblock; and
encrypting the superblock using the first metadata encryption key.

Exemplary Operating Environment

Figure 11:
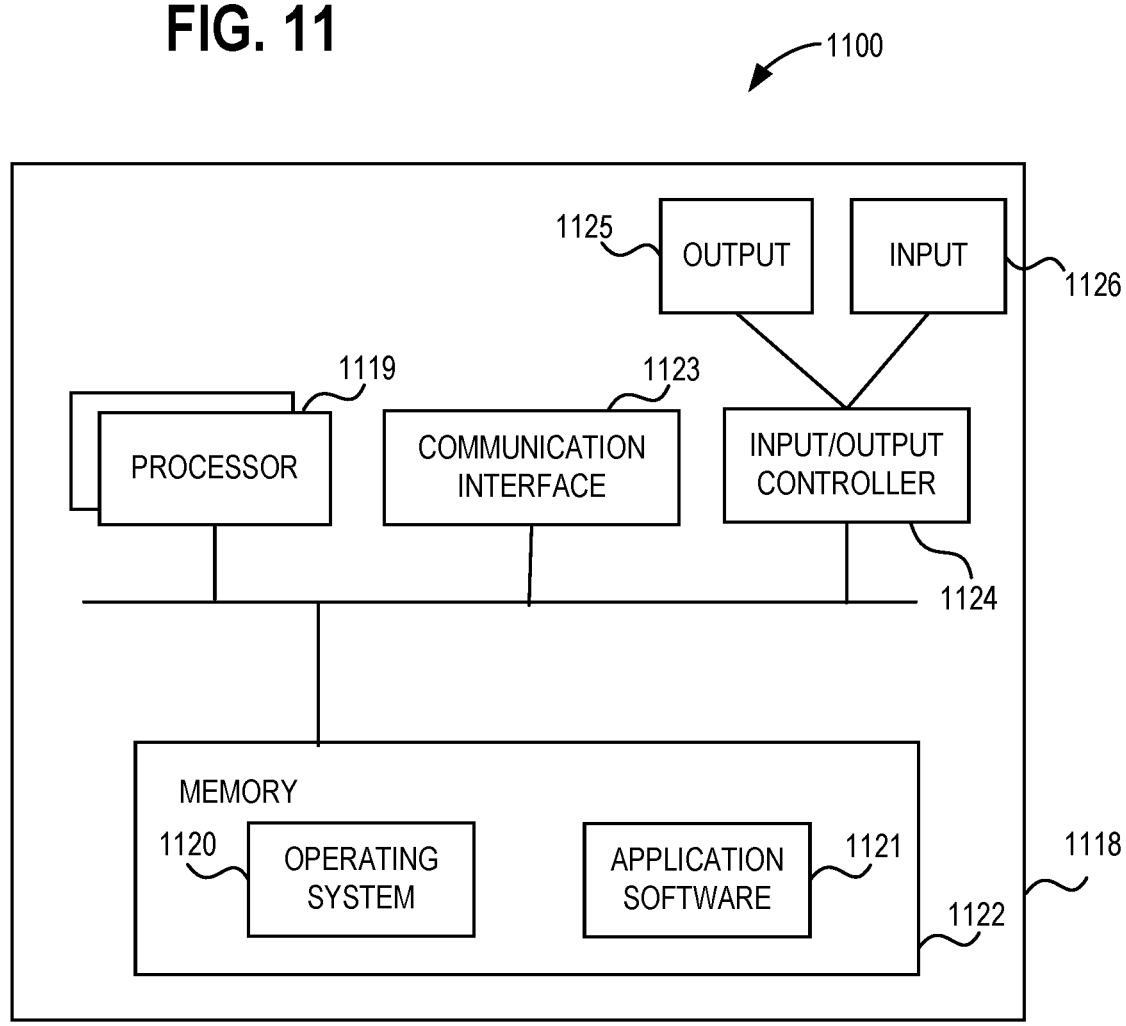
FIG. 11 illustrates a block diagram of an example computing apparatus that may be used as a component of an example architecture such as that of FIG. 1.

The present disclosure is operable with a computing device (computing apparatus) according to an embodiment shown as a functional block diagram 1100 in FIG. 11. In an embodiment, components of a computing apparatus 1118 may be implemented as part of an electronic device according to one or more embodiments described in this specification. The computing apparatus 1118 comprises one or more processors 1119 which may be microprocessors, controllers, or any other suitable type of processors for processing computer executable instructions to control the operation of the electronic device. Alternatively, or in addition, the processor 1119 is any technology capable of executing logic or instructions, such as a hardcoded machine. Platform software comprising an operating system 1120 or any other suitable platform software may be provided on the computing apparatus 1118 to enable application software 1121 (program code) to be executed by one or more processors 1119. According to an embodiment, the operations described herein may be accomplished by software, hardware, and/or firmware.

Computer executable instructions may be provided using any computer-readable medium (e.g., any non-transitory computer storage medium) or media that are accessible by the computing apparatus 1118. Non-transitory computer-readable media may include, for example, computer storage media such as a memory 1122 and communications media. Computer storage media, such as a memory 1122, include volatile and non-volatile, removable, and non-removable media implemented in any method or technology for storage of information such as computer readable instructions, data structures, program modules or the like. Computer storage media include, but are not limited to, hard disks, RAM, ROM, EPROM, EEPROM, NVMe devices, persistent memory, phase change memory, flash memory or other memory technology, compact disc (CD, CD-ROM), digital versatile disks (DVD) or other optical storage, magnetic cassettes, magnetic tape, magnetic disk storage, shingled disk storage or other magnetic storage devices, or any other non-transmission medium (e., non-transitory) that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium does not include a propagating signal per se. Propagated signals per se are not examples of computer storage media. Although the computer storage medium (the memory 1122) is shown within the computing apparatus 1118, it will be appreciated by a person skilled in the art, that the storage may be distributed or located remotely and accessed via a network or other communication link (e.g. using a communication interface 1123 or 112). Computer storage media are tangible, non-transitory, and are mutually exclusive to communication media.

The computing apparatus 1118 may comprise an input/output controller 1124 configured to output information to one or more output devices 1125, for example a display or a speaker, which may be separate from or integral to the electronic device. The input/output controller 1124 may also be configured to receive and process an input from one or more input devices 1126, for example, a keyboard, a microphone, or a touchpad. In one embodiment, the output device 1125 may also act as the input device. An example of such a device may be a touch sensitive display. The input/output controller 1124 may also output data to devices other than the output device, e.g. a locally connected printing device. In some embodiments, a user may provide input to the input device(s) 1126 and/or receive output from the output device(s) 1125.

The functionality described herein can be performed, at least in part, by one or more hardware logic components. According to an embodiment, the computing apparatus 1118 is configured by the program code when executed by the processor 1119 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

Although described in connection with an exemplary computing system environment, examples of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices.

Examples of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

Aspects of the disclosure transform a general-purpose computer into a special purpose computing device when programmed to execute the instructions described herein. The detailed description provided above in connection with the appended drawings is intended as a description of a number of embodiments and is not intended to represent the only forms in which the embodiments may be constructed, implemented, or utilized. Although these embodiments may be described and illustrated herein as being implemented in devices such as a server, computing devices, or the like, this is only an exemplary implementation and not a limitation. As those skilled in the art will appreciate, the present embodiments are suitable for application in a variety of different types of computing devices, for example, PCs, servers, laptop computers, tablet computers, etc.

The term "computing device" and the like are used herein to refer to any device with processing capability such that it can execute instructions. Those skilled in the art will realize that such processing capabilities are incorporated into many different devices and therefore the terms "computer", "server", and "computing device" each may include PCs, servers, laptop computers, mobile telephones (including smart phones), tablet computers, and many other devices. Any range or device value given herein may be extended or altered without losing the effect sought, as will be apparent to the skilled person. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

While no personally identifiable information is tracked by aspects of the disclosure, examples may have been described with reference to data monitored and/or collected from the users. In some examples, notice may be provided, such as via a dialog box or preference setting, to the users of the collection of the data (e.g., the operational metadata) and users are given the opportunity to give or deny consent for the monitoring and/or collection. The consent may take the form of opt-in consent or opt-out consent.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," and "the" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computerized method comprising:
    obtaining a primary encryption key;
    obtaining a first object identifier (ID), the first object ID comprising a globally unique ID (GUID) for a first object;
    obtaining a first data salt comprising the first object ID and a first data salt string;
    obtaining a first metadata salt comprising the first object ID and a first metadata salt string, the first metadata salt string differing from first data salt string;
    generating a first data encryption key using the primary encryption key, the first data salt, and a one-way function;
    generating a first metadata encryption key using the primary encryption key, the first metadata salt, and the one-way function;
    encrypting the first object using the first data encryption key;
    encrypting metadata of the first object using the first metadata encryption key; and
    persisting the encrypted first object and the encrypted metadata of the first object.

2. The computerized method of claim 1, further comprising:
    obtaining a second object ID, the second object ID comprising a GUID for a second object;
    obtaining a second data salt comprising the second object ID and a second data salt string;
    obtaining a second metadata salt comprising the second object ID and a second metadata salt string, the second metadata salt string differing from second data salt string;
    generating a second data encryption key using the primary encryption key, the second data salt, and the one-way function;
    generating a second metadata encryption key using the primary encryption key, the second metadata salt, and the one-way function;
    encrypting the second object using the second data encryption key; and
    encrypting metadata of the second object using the second metadata encryption key.

3. The computerized method of claim 2, wherein the first object comprises a virtual machine (VM) disk (VMDK) and wherein the second object comprises a VMDK.

4. The computerized method of claim 2, further comprising:
    receiving a first read request for the first object;
    based on at least receiving the first read request:
        regenerating the first data encryption key using the primary encryption key, the first data salt, and the one-way function;
        decrypting the first object using the first data encryption key; and
        returning the first object:
    receiving a second read request for the metadata of the first object;
    based on at least receiving the second read request:
        regenerating the first metadata encryption key using the primary encryption key, the first metadata salt, and the one-way function;
        decrypting the metadata of the first object using the first metadata encryption key; and
        returning the metadata of the first object:
    receiving a third read request for the second object;
    based on at least receiving the third read request:
        regenerating the second data encryption key using the primary encryption key, the second data salt, and the one-way function;
        decrypting the second object using the second data encryption key; and
        returning the second object; and
    receiving a fourth read request for the metadata of the second object;
    based on at least receiving the fourth read request:
        regenerating the second metadata encryption key using the primary encryption key, the second metadata salt, and the one-way function;
        decrypting the metadata of the second object using the second metadata encryption key; and
        returning the metadata of the second object.

5. The computerized method of claim 1, wherein the first metadata salt string further comprises a generation number.

6. The computerized method of claim 5, further comprising:
based upon at least a rekey trigger event:
regenerating the first metadata encryption key using the primary encryption key, the first metadata salt, and the one-way function;
decrypting the metadata of the first object using the first metadata encryption key;
changing the generation number;
generating a third metadata encryption key using the primary encryption key, the first metadata salt with the changed generation number, and the one-way function; and
encrypting the metadata of the first object using the third metadata encryption key.

7. The computerized method of claim 6, wherein regenerating the first metadata encryption key comprises:
until determining that a trial metadata encryption key matches the first metadata encryption key:
generating a trial metadata salt comprising the first object ID, the metadata salt string, and a trial generation number;
generating the trial metadata encryption key using the primary encryption key, the trial metadata salt, and the one-way function; and
if the trial metadata encryption key does not match the first metadata encryption key, changing the trial generation number.

8. The computerized method of claim 7, wherein determining that the trial metadata encryption key matches the first metadata encryption key comprises:
decrypting at least a portion of the metadata of the first object using the trial metadata encryption key; and
comparing the portion of the metadata of the first object with a known value.

9. A computer system comprising:
a processor; and
a non-transitory computer readable medium having stored thereon program code executable by the processor, the program code causing the processor to:
obtain a primary encryption key;
obtain a first object identifier (ID), the first object ID comprising a globally unique ID (GUID) for a first object;
obtain a first data salt comprising the first object ID and a first data salt string;
obtain a first metadata salt comprising the first object ID and a first metadata salt string, the first metadata salt string differing from first data salt string;
generate a first data encryption key using the primary encryption key, the first data salt, and a one-way function;
generate a first metadata encryption key using the primary encryption key, the first metadata salt, and the one-way function;
encrypt the first object using the first data encryption key; and
encrypt metadata of the first object using the first metadata encryption key.

10. The computer system of claim 9, wherein the program code is further operative to:
obtain a second object ID, the second object ID comprising a GUID for a second object;
obtain a second data salt comprising the second object ID and a second data salt string;
obtain a second metadata salt comprising the second object ID and a second metadata salt string, the second metadata salt string differing from second data salt string;
generate a second data encryption key using the primary encryption key, the second data salt, and the one-way function;
generate a second metadata encryption key using the primary encryption key, the second metadata salt, and the one-way function;
encrypt the second object using the second data encryption key; and
encrypt metadata of the second object using the second metadata encryption key.

11. The computer system of claim 10, wherein the first object comprises a virtual machine (VM) disk (VMDK) and wherein the second object comprises a VMDK.

12. The computer system of claim 10, wherein the program code is further operative to:
receive a first read request for the first object;
based on at least receiving the first read request:
regenerate the first data encryption key using the primary encryption key, the first data salt, and the one-way function;
decrypt the first object using the first data encryption key; and
return the first object;
receive a second read request for the metadata of the first object;
based on at least receiving the second read request:
regenerate the first metadata encryption key using the primary encryption key, the first metadata salt, and the one-way function;
decrypt the metadata of the first object using the first metadata encryption key; and
return the metadata of the first object;
receive a third read request for the second object;
based on at least receiving the third read request:
regenerate the second data encryption key using the primary encryption key, the second data salt, and the one-way function;
decrypt the second object using the second data encryption key; and
return the second object; and
receive a fourth read request for the metadata of the second object;
based on at least receiving the fourth read request:
regenerate the second metadata encryption key using the primary encryption key, the second metadata salt, and the one-way function;
decrypt the metadata of the second object using the second metadata encryption key; and
return the metadata of the second object.

13. The computer system of claim 9, wherein the first metadata salt string further comprises a generation number.

14. The computer system of claim 13, wherein the program code is further operative to:
based upon at least a rekey trigger event:
regenerate the first metadata encryption key using the primary encryption key, the first metadata salt, and the one-way function;
decrypt the metadata of the first object using the first metadata encryption key;
change the generation number;

generate a third metadata encryption key using the primary encryption key, the first metadata salt with the changed generation number, and the one-way function; and encrypt the metadata of the first object using the third metadata encryption key.

15. The computer system of claim 14, wherein regenerating the first metadata encryption key comprises:

until determining that a trial metadata encryption key matches the first metadata encryption key:

generating a trial metadata salt comprising the first object ID, the metadata salt string, and a trial generation number;

generating the trial metadata encryption key using the primary encryption key, the trial metadata salt, and the one-way function; and if the trial metadata encryption key does not match the first metadata encryption key, changing the trial generation number.

16. The computer system of claim 15, wherein determining that the trial metadata encryption key matches the first metadata encryption key comprises:

decrypting at least a portion of the metadata of the first object using the trial metadata encryption key; and comparing the portion of the metadata of the first object with a known value.

17. An encryption manager comprising:

a key generator for obtaining a primary encryption key, a first object identifier (ID) comprising a globally unique ID (GUID) for a first object, a first data salt comprising the first object ID and a first data salt string, and a first metadata salt comprising the first object ID and a first metadata salt string and which differs from first data salt string; and generating a first data encryption key using the primary encryption key, the first data salt, and a one-way function, and generating a first metadata encryption key using the primary encryption key, the first metadata salt, and the one-way function; and an encrypter for encrypting the first object using the first data encryption key and encrypting metadata of the first object using the first metadata encryption key.

18. The encryption manager of claim 17, wherein the key generator further obtains a second object ID, the second object ID comprising a GUID for a second object, a second data salt comprising the second object ID and a second data salt string, and a second metadata salt comprising the second object ID and a second metadata salt string and which differs from second data salt string; and generates a second data encryption key using the primary encryption key, the second data salt, and the one-way function, and generates a second metadata encryption key using the primary encryption key, the second metadata salt, and the one-way function; and the encrypter further encrypts the second object using the second data encryption key and encrypts metadata of the second object using the second metadata encryption key.

19. The encryption manager of claim 18, wherein the first object comprises a virtual machine (VM) disk (VMDK) and wherein the second object comprises a VMDK.

20. The encryption manager of claim 18, wherein the encryption manager further:

regenerates the first data encryption key using the primary encryption key, the first data salt, and the one-way function;

decrypts the first object using the first data encryption key;

regenerates the first metadata encryption key using the primary encryption key, the first metadata salt, and the one-way function;

decrypts the metadata of the first object using the first metadata encryption key;

regenerates the second data encryption key using the primary encryption key, the second data salt, and the one-way function;

decrypts the second object using the second data encryption key;

regenerates the second metadata encryption key using the primary encryption key, the second metadata salt, and the one-way function; and decrypts the metadata of the second object using the second metadata encryption key.

* * * * *